United States Patent
Zeng et al.

(10) Patent No.: US 10,679,653 B1
(45) Date of Patent: Jun. 9, 2020

(54) HIGH POWER RATIO MODE FOR TAMR DRIVES

(71) Applicants: SAE Magnetics (H.K.) Ltd., Shatin, N.T. (HK); Headway Technologies, Inc., Milpitas, CA (US)

(72) Inventors: Qinghua Zeng, Fremont, CA (US); Siu Yin Ngan, San Jose, CA (US); Soramany Ka, San Jose, CA (US); Ellis Cha, San Ramon, CA (US)

(73) Assignees: SAE Magnetics (H.K.) Ltd., Shatin, New Territories (HK); Headway Technologies, Inc., Milpitas, CA (US)

(*) Notice: Subject to any disclaimer, the term of this patent is extended or adjusted under 35 U.S.C. 154(b) by 0 days.

(21) Appl. No.: 16/296,366

(22) Filed: Mar. 8, 2019

(51) Int. Cl.
| | |
|---|---|
| *G11B 11/105* | (2006.01) |
| *G11B 11/10* | (2006.01) |
| *G11B 5/48* | (2006.01) |
| *G11B 5/60* | (2006.01) |
| *G11B 5/127* | (2006.01) |
| *G11B 5/00* | (2006.01) |

(52) U.S. Cl.
CPC .......... *G11B 5/4866* (2013.01); *G11B 5/1278* (2013.01); *G11B 5/6011* (2013.01); *G11B 2005/0021* (2013.01)

(58) Field of Classification Search
CPC ..... G11B 5/6005; G11B 5/6088; G11B 13/04; G11B 2005/0021; G11B 7/1267; G11B 5/09; G11B 7/1263; G11B 5/314; G11B 5/59633; G11B 5/54; G11B 5/012; G11B 27/36; G11B 5/3903; G11B 11/105; G11B 11/10; G11B 1/125; G11B 5/6047; H01L 41/12; H01L 41/125

USPC ..... 360/31, 25, 59, 75, 313, 328; 369/13.13, 369/13.14, 13.33, 13.34, 13.32
See application file for complete search history.

(56) References Cited

U.S. PATENT DOCUMENTS

| | | | |
|---|---|---|---|
| 8,654,618 B1 * | 2/2014 | Liu | ........................ G11B 5/314 369/13.33 |
| 9,208,811 B1 | 12/2015 | Kim et al. | |
| 9,842,618 B1 | 12/2017 | Hutchinson et al. | |
| 10,049,693 B2 | 8/2018 | Hutchinson et al. | |
| 2016/0232930 A1 | 8/2016 | Lou et al. | |

* cited by examiner

*Primary Examiner* — Nabil Z Hindi
(74) *Attorney, Agent, or Firm* — Saile Ackerman LLC; Stephen E. Ackerman

(57) ABSTRACT

A method of operating a HDD having a read/write head configured for Perpendicular Magnetic Recording (PMR) and configured for use in Thermally Assisted Magnetic Recording (TAMR). By using selected settings of a power ratio (PR) value to ensure that accurate fly height (FH) measurements of head-disk interference (HDI) can be taken during write touchdowns (TDs), head damage can be eliminated during HDI events. Under normal operating conditions the PMR head develops a sharp protrusion due to heating from the TAMR apparatus as well as the write current and read and write heaters. The sharp protrusion is prone to striking the disk surface, instead of the shields doing so. The shields would be more capable of absorbing the HDI, which would allow the HDI sensors (HDIs) to provide a more sensitive reading of the HDI which would prevent head wear caused by the sharp protrusion. By adjusting the power ratio (PR) to be at least the turning point (TP) value, the write shield will approach the disk surface before the sharp protrusion.

17 Claims, 9 Drawing Sheets

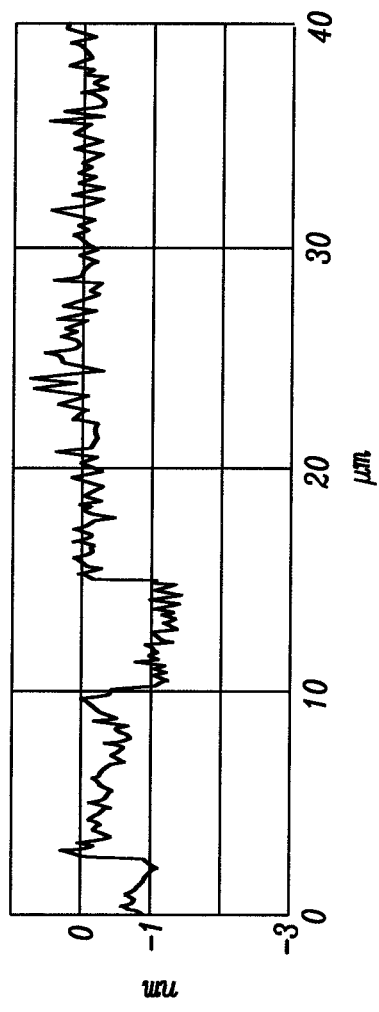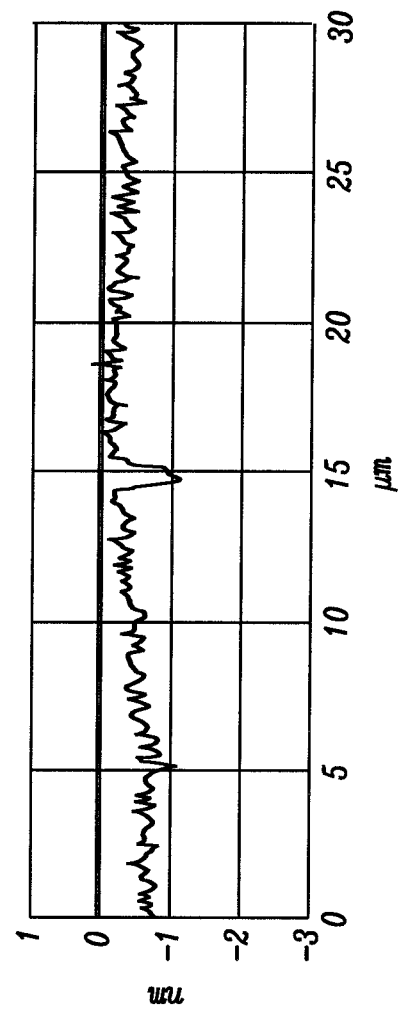
FIG. 4A
FIG. 4B

HIGH POWER RATIO MODE FOR TAMR DRIVES

TECHNICAL FIELD

This disclosure relates to magnetic write heads that write on magnetic recording media, particularly to those that use Thermally Assisted Magnetic Recording (TAMR) in order to temporarily reduce the coercivity of high-coercivity magnetic media that is required when recordings are to be made at extremely high recording density.

BACKGROUND

Hard disk drives (HDD) have been increasing the recording density of the magnetic disks on which data storage occurs. Correspondingly, the thin-film magnetic heads used to write and read that data have been required to improve their performance as well. The thin-film read/write heads most commonly in use are of a composite type, having a structure in which a magnetic-field detecting device, such as a giant-magnetoresistive (GMR) read sensor is used together with a magnetic recording device, such as an inductive electromagnetic coil. These two types of devices are laminated together and mounted on a rectangular solid prism-shaped device called a slider. The slider literally flies over the rotating surface of a disk while being held aloft by aerodynamic forces at a height called the fly height (FH). The read/write head is mounted in the slider where it serves to both read and write data signals, respectively, from and onto magnetic disks which are the usual magnetic recording media in a HDD. Typically, the magnetic writer portion of the read/write head is a small electrically activated coil that induces a magnetic field in a magnetic pole. The field, in turn, emerges at a narrow write gap (WG) and can change the direction of the magnetic moments of small magnetic particles, or groups of particles, embedded in the surface of the disk. If the embedded particles are embedded in such a way that their magnetic moments are perpendicular to the disk surface and can be switched up and down relative to the plane of that surface, then you have what is called perpendicular magnetic recording (PMR). The perpendicular arrangement produces a more densely packed region for magnetic recording.

Perpendicular magnetic recording (PMR) heads have made it possible to extend the increase in the recording density of hard disk drives (HDD) beyond 100 Gb/in2 (100 gigabytes per square inch) However, even using PMR heads, it is difficult to extend the density beyond 1 Tb/in2 due to thermal instabilities and the media's super-paramagnetic limit (the inability to maintain a stable domain structure). In order to achieve a higher recording density, a new technology has been developed: Thermally Assisted Magnetic Recording (TAMR). Briefly, the media that are now used to record at these ultra-high densities must have extremely high coercivities so that data, once it is recorded, can remain stable even when subjected to thermal effects. Unfortunately, the high coercivities required to maintain the data once it is recorded, also makes it difficult for the small PMR heads to provide the necessary flux to actually record that data. One way to record on highly coercive media, is to heat the recording media during the actual recording process so that it reaches its Curie temperature, temporarily reducing its coercivity and then to record the data on the heated surface. When the surface cools, the coercivity is restored to its ambient value and the recorded data is thermally stabilized.

A typical TAMR recording apparatus is furnished with a PMR read/write head configured to transfer optical energy to the surface of a magnetic recording disk having high coercivity and, for the TAMR operational portion, a laser diode to provide optical energy in the form of optical radiation, an optical waveguide to transfer that radiation towards the ABS of the head where it gets close to the recording surface, and a plasmon near-field generator located near that ABS. The plasmon generator is a device that receives the optical radiation from the waveguide, converts it to plasmon modes by electromagnetic coupling and then transfers energy from the plasmon near-fields to a small region of the recording media through the write head portion of the PMR read/write head. The localized near-field energy appears as a near-field spot at the tip of the plasmon generator's air bearing surface (ABS), which is located just below the trailing edge side of the magnetic pole tip. This tiny near field spot, which is not subject to diffraction effects, induces a very localized temperature rise in the recording media to assist the magnetic writing. At the same time, however, the near-field energy induces a very sharp or localized thermal protrusion on the recording head that causes many undesirable issues that should be dealt with. It will be the object of this disclosure to deal with certain of those issues.

SUMMARY

The first object of this disclosure is to provide a method of improving TD detection for a TAMR head so that flying height can be more accurately measured and maintained during HDD operation.

A second object of this disclosure is to provide such a method that also permits HDIs to be closer to the media surface where their sensitivity is increased to detecting various effects such as vibrations.

A third object of the present disclosure is to provide such a method that also enables a reduction in head wear by eliminating wear to the sharp protrusions that inevitably occur during the heating effects produced by the TAMR method.

A fourth object of the present disclosure is to provide such a method that also allows a reduction in write-gap spacing producing a better overall write performance and higher ADC.

A fifth object of the present disclosure is to provide such a method that will operate within the present HDD without additional costly modifications. Such a method will be described below in terms of a quantity called the power ratio (PR), which provides optimal settings of the Hr and Hw for various operational conditions.

We will describe a method for operating a slider-mounted PMR read/write head configured for Perpendicular Magnetic Recording using Thermally Assisted Recording (PMR TAMR). Ultimately the PMR TAMR will be mounted in a hard disk drive (HDD) that includes a rotatable hard disk and a TAMR apparatus that provides the optical energy. The PMR read/write head includes a magnetically shielded read head and a magnetically shielded write head and the read/write head further includes at least one read heater (Hr) formed adjacent to the read head and at least one write heater (Hw) formed adjacent to the write head, where Hr and Hw are configured for being supplied power independently. The PMR read/write head also includes at least one head-disk interference sensor (HDIs). The PMR read/write head is subsequently mounted in a slider, which is a rectangular prism that is aerodynamically configured to support the PMR head at a flying height (FH) above a rapidly rotating magnetic recording medium. Then, using this apparatus, upon setting the hard disk into rotational motion, a value of a power ratio, PR, is chosen, where PR=([Hr power]/[(Hr power)+(Hw power)])*100%, to ensure that when a read or write touchdown occurs, the read shields and write shields and the HDIs will approach the disk surface to within a distance that will enable said HDIs to effectively and reliably signal said touchdown and will protect from wear a sharp protrusion of said write head caused by TAMR heating.

Referring now to FIG. 1A, there is shown a schematic ABS view of a PMR read/write head configured for TAMR operation, as though looking up from a disk surface. The PMR head is generally formed as a magnetically shielded read head portion and a magnetically shielded write head portion. The presence of the TAMR apparatus is observed at the write head portion where a small opening beneath the magnetic pole tip provides the emergence of the plasmon near-fields, as will be described below. Note, we do not show the full TAMR apparatus (laser, waveguide, plasmon generator) that supplies the optical power to the write head as this disclosure will be concerned with factors pertaining to the operation of the head itself.

Referring back to FIG. 1A, there is shown a lower read shield, 10, a read element, 20, an upper read shield, 30, HDI sensors 40 that detect impending "interference" (i.e., contact) between the head and the disk by means of induced vibrations. It should be noted that the HDI sensors operate most effectively (give reliable signals) when they are close to the surface of the disk and can receive the vibrational signals from whatever element(s) of the head are in the process of an impending TD.

Next in the figure is seen a lower write shield 50, an additional pair of write shields formed on the lower write shields, the pair including a first write shield 60 and a second write shield 70, a write element (i.e., the magnetic pole tip) 90 with the near-field spot 80 being below the write element and, finally, a narrow upper write shield 100 just above the write element.

Referring next to FIG. 1B there is shown in an enlarged detail the write-gap region of FIG. 1A. In FIG. 1B there is shown the upper write shield 100, the emerging main pole face 90 and the near-field spot 80 beneath the emerging main pole face. The upper write shield is shown as having a rectangular cross-section, but other shapes are possible.

Not visible in the ABS view of FIG. 1A, because they are located behind the ABS plane, are two heating elements that might be embedded In a TAMR head. One, the reader heater, Hr, is close to the read element, and another, the write heater, Hw, is close to the write element. Typically, these heaters are located somewhat proximally away from the ABS, and are not visible in this ABS view.

The use of heaters is important because they allow the flying height of the head to be adjusted so that greater density in both reading and writing processes can be obtained. However, to obtain precision in applying the heaters, it is necessary that the spacing between the head and the disk can be carefully controlled. This requires that the spacing can be measured and related to the operation of the heaters. Unfortunately, because the measurement process involves intentionally reducing the spacing between the head and the disk to a position as close as possible to a contact, there is the danger that unintentional touchdowns (TD) will occur during which the head and disk actually come in contact, in which case the head can receive significant damage.

BRIEF DESCRIPTION OF THE DRAWINGS

FIG. 3A shows a down-track profile before TD, FIG. 3B is the down-track profile after TD, FIG. 3C is the cross-track profile before TD and FIG. 3D is the cross-track profile after TD. The head wear is the result of 4.0 nm reduction in the height of a sharp protrusion resulting from localized TAMR heating of the write head.

FIG. 4A and 4B are two illustrations showing graphical evidence of head wear after a standardized spin-stand test with PR=60%. The head wear is sharply reduced, compared to what is shown in FIGS. 3A-3D, to a 0.5 nm reduction in the height of a sharp protrusion resulting from localized TAMR heating of the write head.

DETAILED DESCRIPTION

Figure 1A:
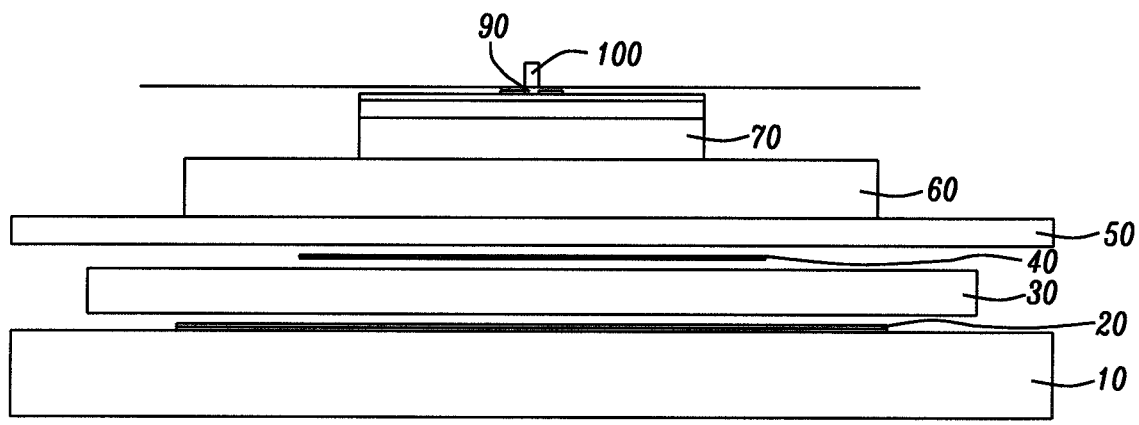
FIG. 1A is a schematic ABS view of a PMR write head showing its elements.
Figure 1B:
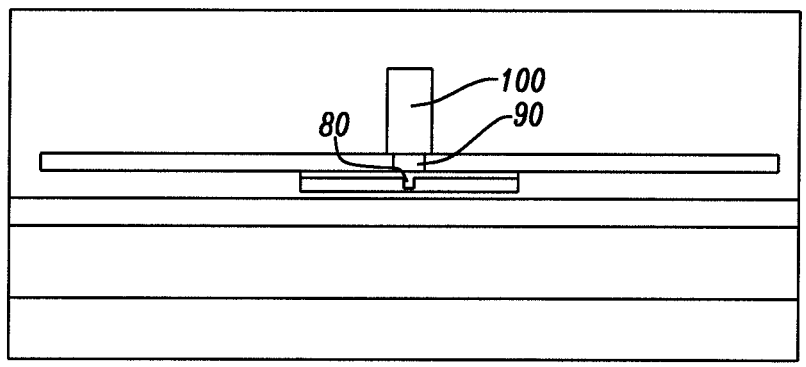
FIG. 1B is a magnified view of a portion of FIG. 1B showing the upper write shield, the pole face and the near-field spot.

When electric power is supplied to the read and write heaters, Hr and Hw respectively, they heat up and expand their surrounding areas, and the particular read or write element being heated protrudes locally outward. This protrusion alters the vertical spacing between the head and the disk during HDD operation, so that it can be reduced locally during reading and writing to achieve a higher recording density. Typically, only Hr is energized during reading, while only Hw is energized during writing. For a more sophisticated application, both Hr and Hw might be energized. Such a case is called the "power ratio (PR) mode". The PR is defined as:

PR=([Hr power]/[(Hr power)+(Hw power)])*100%.

In order to control the head/disk spacing through use of the heaters, it is necessary to have a feasible way of measuring the spacing while applying the power to the heaters. Relative spacing change can be calculated theoretically based on use of the well-known Wallace equation (which is not described here). However, to determine the actual spacing, a reference point must be established. The reference point is usually taken to be the point where the head actually touches the disk. It is considered as the zero point (z=0) of the vertical spacing. The process used to find the reference point is called a touch down (TD) detection because it requires manipulating the position of the head during disk rotation so that it essentially touches the disk surface in a detectable manner. After the reference point is found, the desired absolute spacing can be set to a specified value, such as 0.8 nm, which is used for current HDDs, by adjusting the power supplied to the heaters during reading and writing.

For a better TD detection and potential real time monitoring of head-disk spacing, the typical TAMR head also includes a head-disk interference sensor (HDIs). This sensor is a resistive temperature sensor used to detect a temperature change in the head that is induced by changes in clearance during head vibrations or by a direct contact caused by contacting with disk asperities. The HDIs signal has both DC and AC components. When the slider runs at some constant height and does not contact the disk, the temperature is constant and a DC component is present. When the slider actually contacts the disk and even for a short time after such contact occurs, a strong high frequency (AC component) HDIs signal might appear if TD-induced vibration is strong. In such a case, the AC component of the HDIs signal can be used to detect the TD. Spacing between the sensor and the disk during TD has a direct effect on the sensor sensitivity, and small sensor spacing is preferred.

When PR=0% or is in a lower range close to 0%, the write shield will contact the disk during TD and when PR=100% or in a high range close to 100%, the reader shield will contact the disk during TD. By adjusting PR to be near the middle of its range, both writer and reader shields will contact the disk during TD. This mid-range PR value is called the "turning point" (TP). In the conventional (non-TAMR) PMR case, the PR value is chosen to ensure that the writer shield will contact the disk for write TD, so PR is chosen to be slightly less than the TP for write TD and during writing. During read TD and reading operations, PR is chosen to ensure the reader shield will contact the disk, so PR is chosen to be slightly larger than TP for read TD and reading operations. This is for a conventional PR mode. However, in the TAMR case, there is a sharp protrusion on the head caused by the laser heating during writing. Therefore, during a write TD in the TAMR PR mode, it is the sharp protrusion that contacts the disk rather than the larger shields. This raises two significant issues: TD detection difficulty and head wear.

Figure 2A:
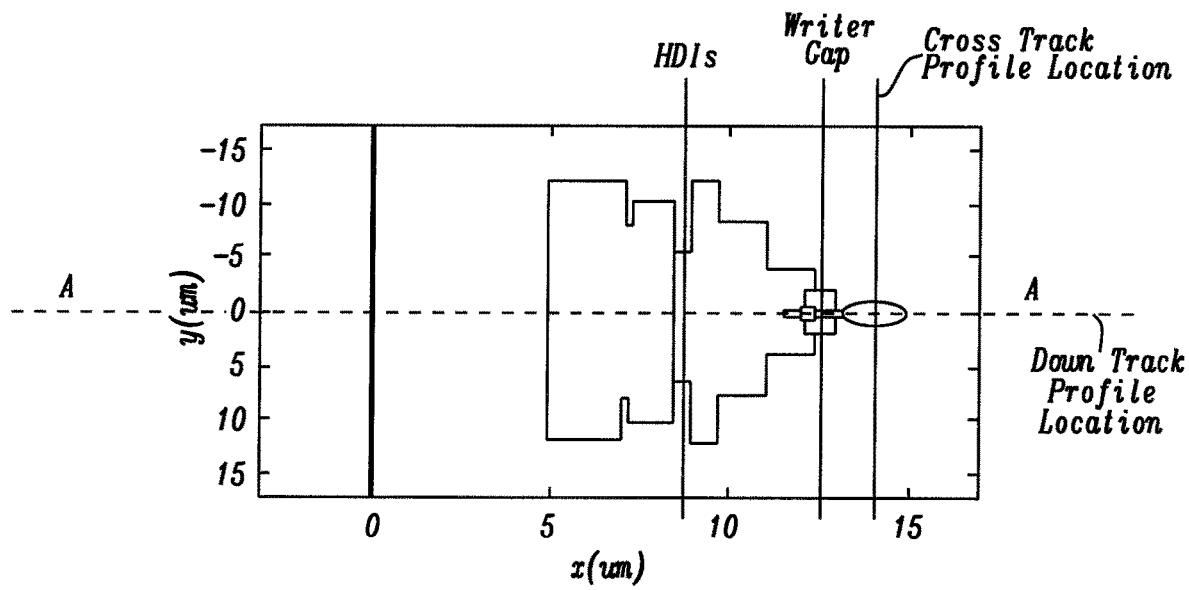
FIG. 2A is a schematic, more simplified ABS view of the write head of FIG. 1A during a write TD, showing the area of the region of contact with a disk surface.
Figure 2B:
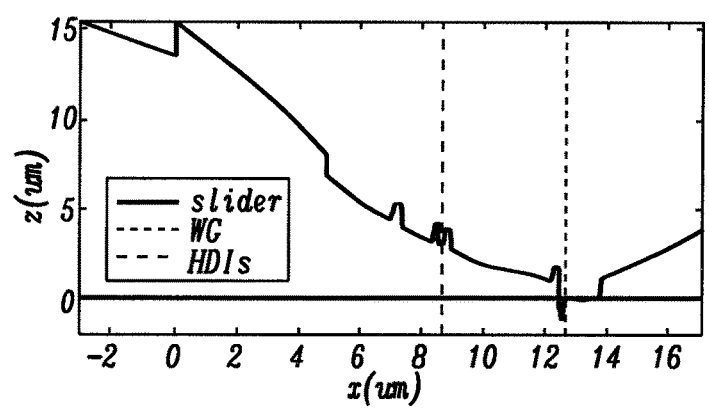
FIG. 2B is a graphical illustration aligned with FIG. 2A showing the vertical spacing of the various elements of the TAMR slider/write head ABS in FIG. 2A, from the disk surface and indicating the positions of the HDIs and the write gap that were shown in FIG. 2A.
Figure 3A:
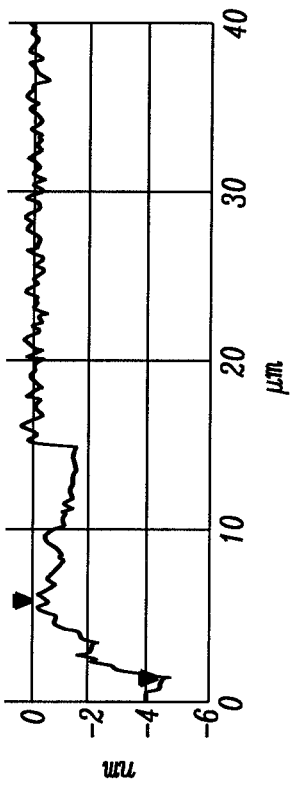
FIGS. 3A-3D are four illustrations showing graphical evidence of head wear after a standardized spin-stand test with PR=0%.
Figure 3B:
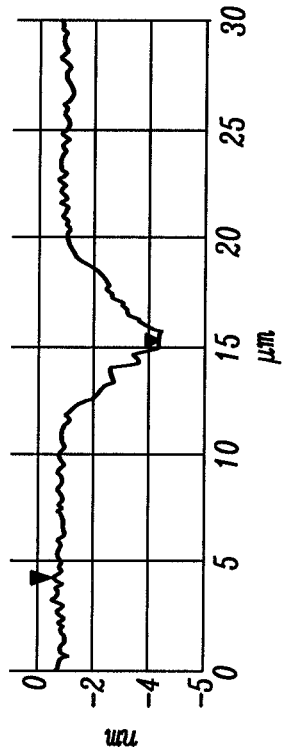
Figure 3C:
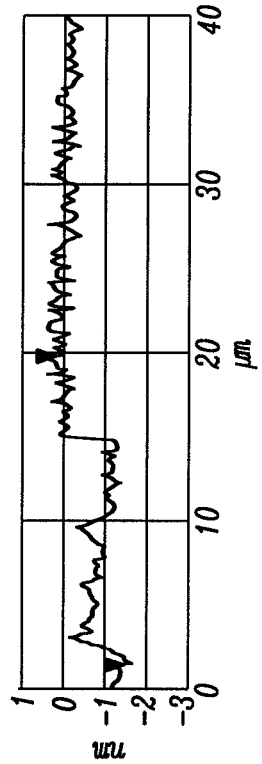
Figure 3D:
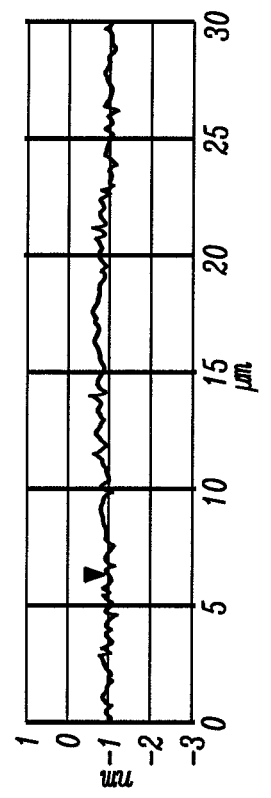

The TD detection difficulty is due to the following two factors:
  a) Very weak TD vibration, due to the small contact area of the sharp protrusion, as shown in FIGS. 2A and 2B
  b) Very weak HDIs signal due to a very large HDIs vertical spacing between sensor and media, as shown in FIGS. 3A-3B The head wear is a result of the fact that the sharp protrusion that contacts the disk is actually worn away by that contact, so it must be avoided.

We refer now to FIGS. 2A and 2B which illustrate the effects of a write TD. FIG. 2A is a simplified ABS view of the TAMR head shown in FIG. 1A, indicating those portions of the head that will approach the disk surface at different heights. The x-direction in 2A is the down-track direction, the y-direction is the cross-track direction and the z-direction, which is used in in FIG. 2B, is the vertical height of the ABS above the disk. FIG. 2B is a curved line showing the spacing from the disk surface of the various parts of the slider-mounted head, as a function of the down-track direction (x-direction), as the TD occurs. The two figures are placed vertically above each other so that the vertical spacing of corresponding specific points of the TAMR slider-mounted head in 2A can be easily visualized on the graph in 2B. FIG. 2A shows the cross-track profile (small elliptical region), of the touch-down region of the head at about x=14 (microns), which is basically the upper shield of the write-head (shown as 100 in FIG. 1A). Slightly behind this region is the writer gap (pole tip emergence) at about x=12.5 and behind that are the HDIs, at about x=8.5 and the read gap at about x=7. This figure (FIG. 2B) represents the vertical position (fly-height) of those same various regions on the write head during a write TD.

Figure 7:
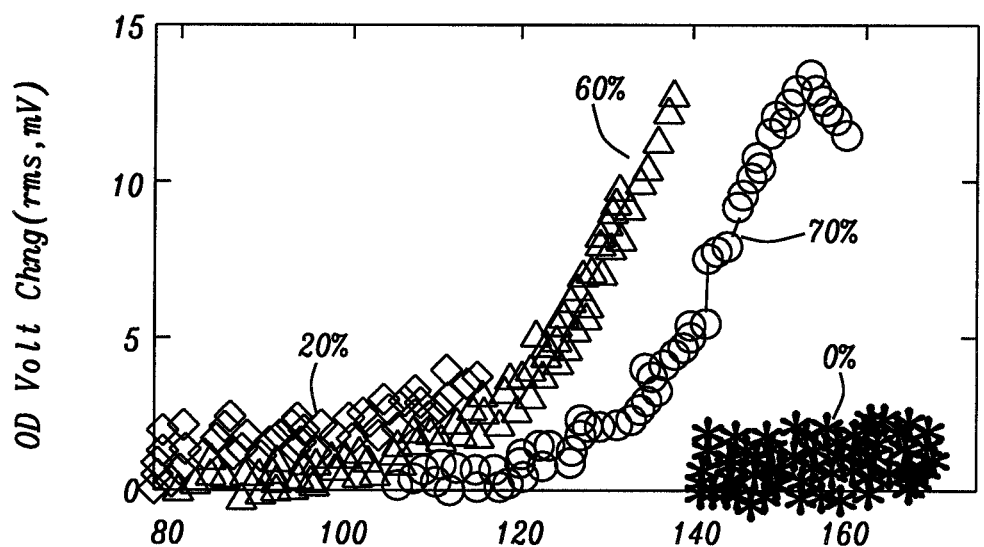
FIG. 7 shows the nature of the HDIs signals corresponding to four different PR values (0%, 20%, 60% and 70%) during a write TD, indicating the improved accuracy of those signals for the higher PR values.

During TD, a sharp thermal protrusion is very easily worn down. This is especially true because current TAMR recording media is rougher than the PMR media. FIGS. 3A-3D show an example of head wear, before and after a standardized spin-stand TD test (which demonstrates effects of a TD at various radii of the disk) with PR=0%. Comparing cross-track profiles in 3C and 3D before and after the TD, we can see a very severe wear (about 4 nm) at the head that occurs at the sharp protrusion area FIG. 7 shows HDIs signals during write TD with four different PR values (PR=0%, 20%, 60% and 70%). A high PR, such as 60% or 70%, gives a much stronger HDIs signal during TD, making TD detection much easier and reliable. FIGS. 4A and 4B show down-track and cross-track head wear, respectively, after the TD test. Comparing FIGS. 4A and 4B to FIGS. 3A and 3D, we can see that the head wear has been reduced dramatically from 4.0 nm (in FIGS. 3A-3D) to about 0.5 nm (FIGS. 4A and 4B) with exactly the same test procedure but different PR value.

The above objects will be achieved by adjusting PR during HDD operation to ensure that it is the broadly protruding shields that act as bumper pads during TD to enhance TD detection and thereby avoid wear at locations on the head that have a sharp protrusion. To achieve this goal, the PR value is preferably set equal to, or larger than TP. As an example, FIGS. 5A-5F shows the contact area (5A,5C, 5E) and down track profile (5B,5D,5F) of the protrusion bulge at the ABS of a slider-mounted read/write head during a write TD. FIG. 6 shows the modeled vertical spacing (fly height) above the disk of the HDIs and the writer gap for the same slider-mounted read/write head, for the entire range of PR settings, during a write TD.

Figure 5B:
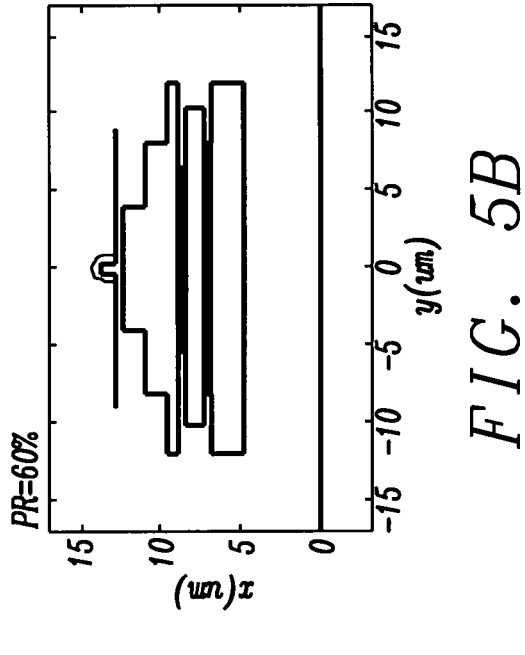
FIGS. 5A-5F are illustrations (analogous to FIGS. 2A-2B), showing ABS write head contact areas (5A, 5C and 5E) and HDIs spacing from disk surface (5B, 5D and 5F) for PR=0% (A-B), PR=60% (C-D) and PR=70% (E-F).
Figure 5A:
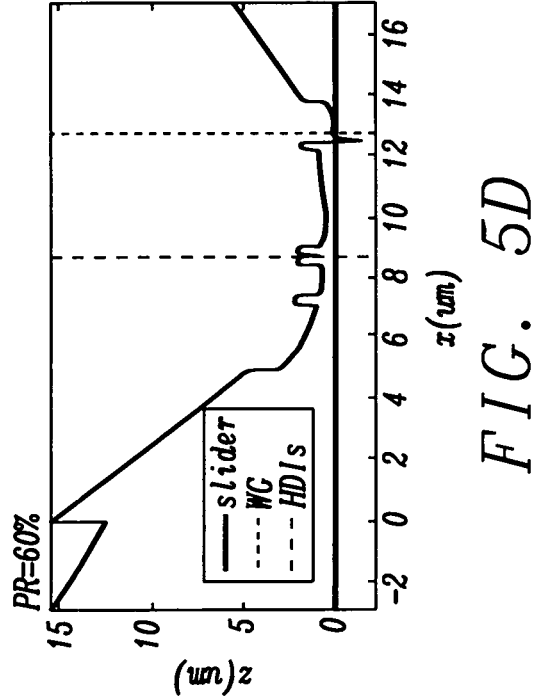
Figure 5D:
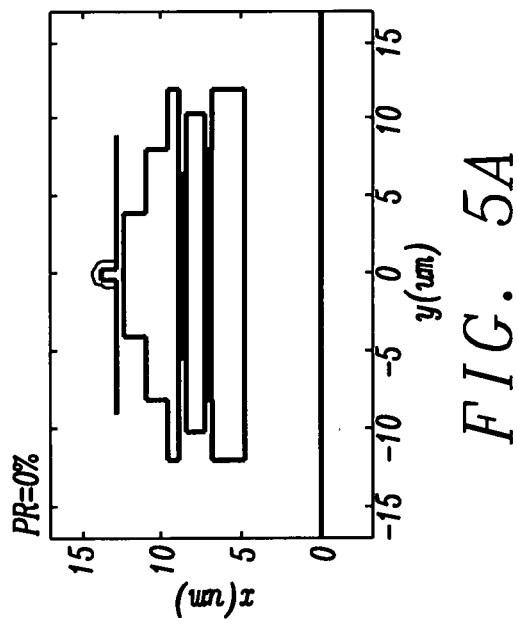
Figure 5C:
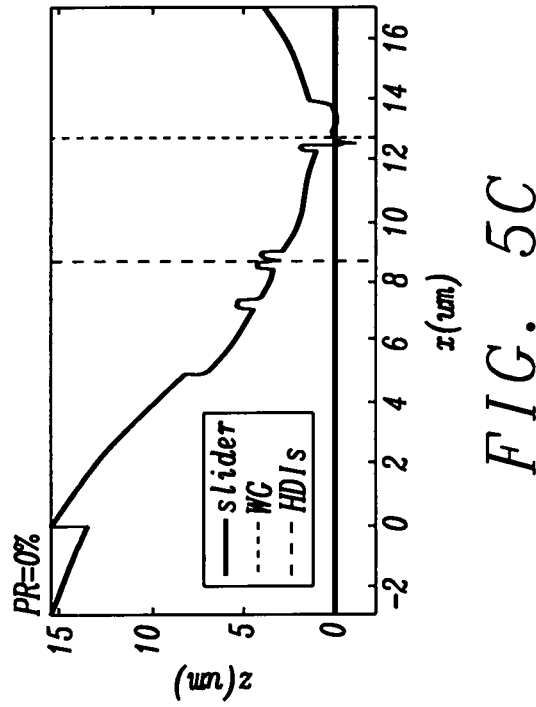
Figure 5E:
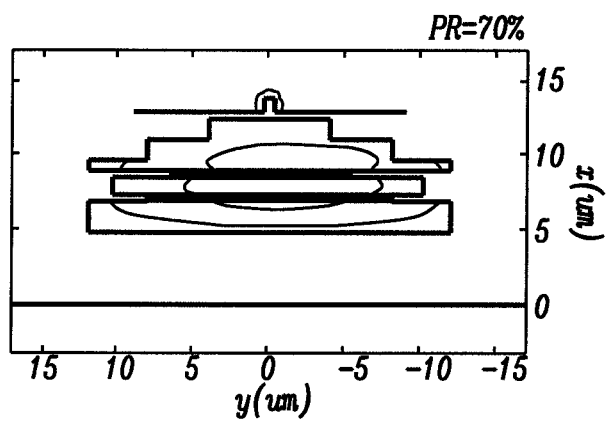
Figure 5F:
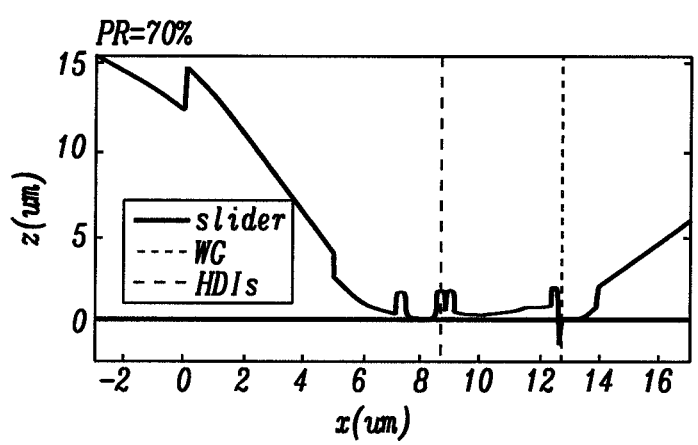
Figure 6:
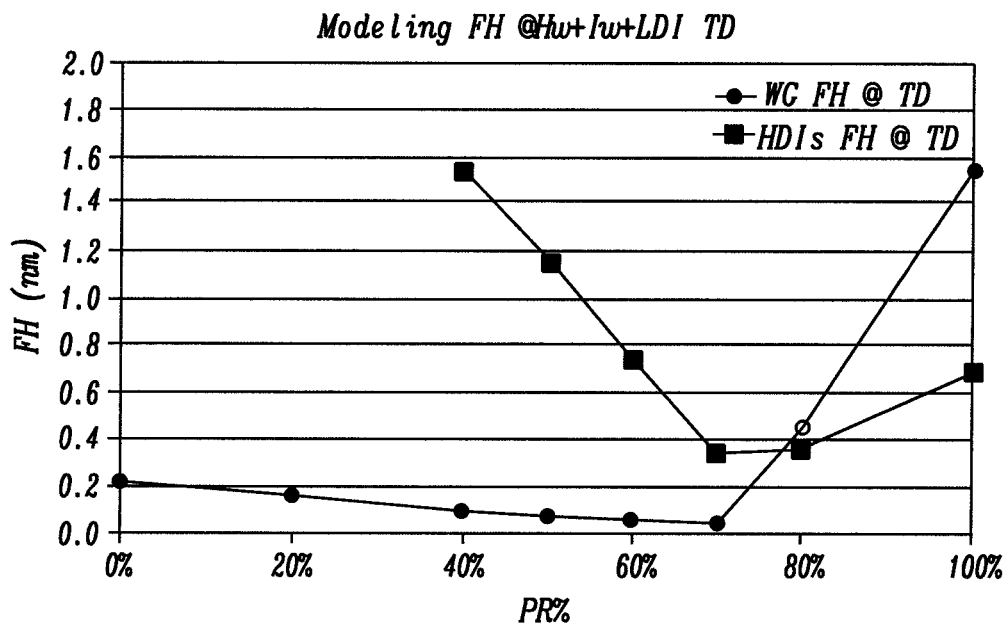
FIG. 6 is a model of vertical spacing (FH) of the HDIs and writer gap during a write TD for a complete range of PR % values from 0% to 100%.

We can see from FIG. 5A that with PR=0%, a value that is currently used in a TAMR drive, surface contact area during TD is very small (small circular area) and HDIs spacing (vertically above the media) is very large. However, when PR=70% is used (5E), the contact area during TD is very large (large irregular area), and HDIs spacing is very small. In this circumstance, TD detection should be improved and the head wear would also be reduced as the shields absorb the brunt of the contact.

FIG. 7 shows HDIs signals during write TD with different PR values. A high PR, such as 60% or 70%, gives a much stronger HDIs signal during TD, so that TD detection is much easier to interpret and is more reliable. This result indicates the importance of PR selection both in protecting the head and in reliably establishing the height of the head based on HDIs signals.

FIGS. 4A and 4B shows down-track and cross-track head wear profiles after a TD test with PR=60%. Comparing FIGS. 4A and 4B to corresponding illustrations in FIGS. 3A-3D, we can see that the head wear was reduced dramatically from 4.0 nm to about 0.5 nm with exact same test procedure but PR=0% in FIGS. 3A-3D and PR=60% in FIGS. 4A and 4B.

Figure 8:
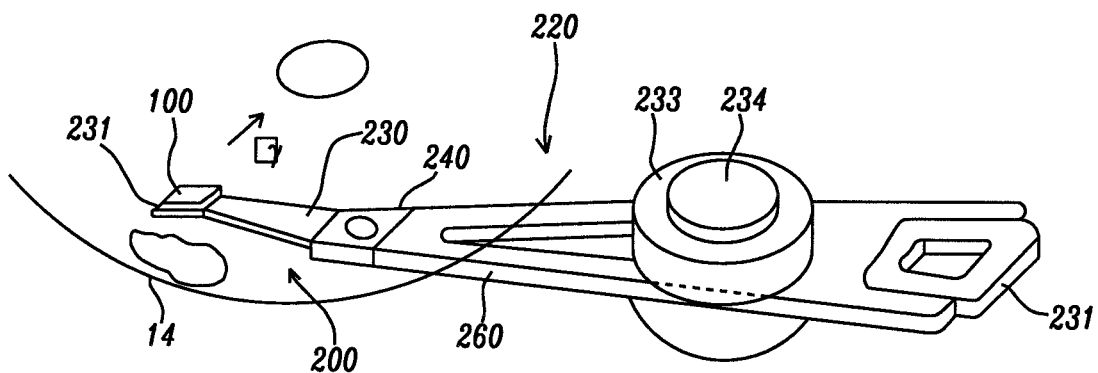
FIG. 8 schematically shows a perspective view of a head arm assembly of the present recording apparatus.
Figure 9:
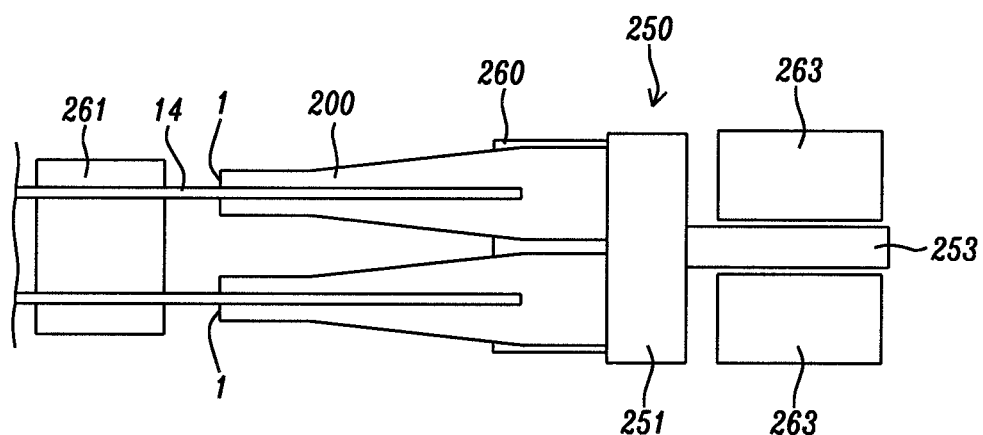
FIG. 9 schematically shows a side view of a head stack assembly of the present recording apparatus.
Figure 10:
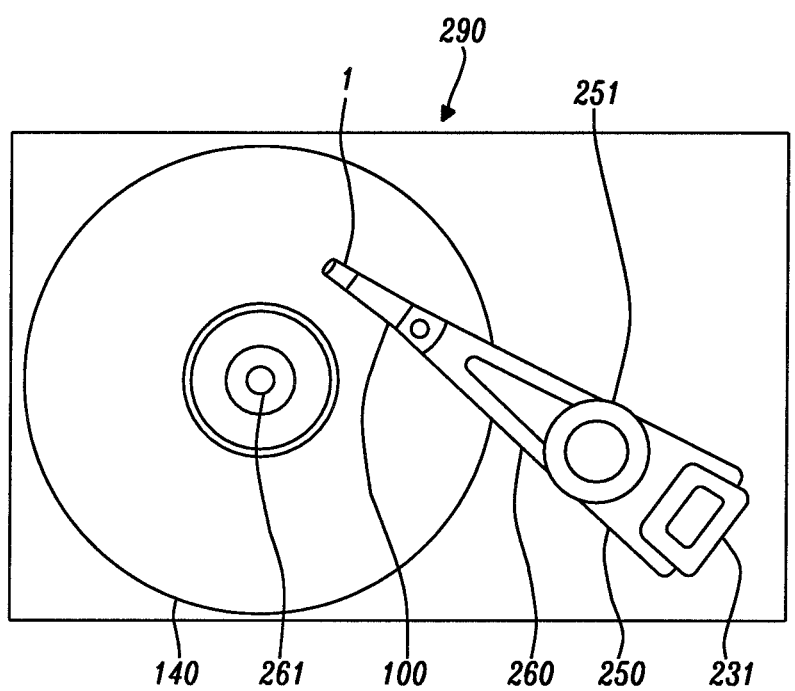
FIG. 10 schematically shows a plan view of the magnetic recording apparatus within which are mounted the components shown if FIGS. 8 and 9.

Referring finally to FIGS. 8, 9 and 10, there is shown an exemplary magnetic recording apparatus, such as a TAMR configured hard disk drive (HDD), through whose use the PMR read/write head configured for TAMR described above will meet the objects of this disclosure.

FIG. 8 shows a head gimbal assembly (HGA) 200 that includes the slider-mounted PMR read/write head 100 and a suspension 220 that elastically supports the head 100. The suspension 220 has a spring-like load beam 230 made with a thin, corrosion-free elastic material like stainless steel. A flexure 231 is provided at a distal end of the load beam and a base-plate 240 is provided at the proximal end. The TAMR 100 is attached to the load beam 230 at the flexure 231 which provides the TAMR with the proper amount of freedom of motion. A gimbal part for maintaining the PMR read/write head at a proper level is provided in a portion of the flexure 231 to which the TAMR 100 is mounted.

A member to which the HGA 200 is mounted to arm 260 is referred to as head arm assembly 220. The arm 260 moves the read/write head 100 in the cross-track direction y across the medium 14 (here, a hard disk). One end of the arm 260 is mounted to the base plate 240. A coil 231 to be a part of a voice coil motor is mounted to the other end of the arm 260. A bearing part 233 is provided to the intermediate portion of the arm 260. The arm 260 is rotatably supported by a shaft 234 mounted to the bearing part 233. The arm 260 and the voice coil motor that drives the arm 260 configure an actuator.

Referring next to FIG. 9 and FIG. 10, there is shown a head stack assembly and a magnetic recording apparatus in which the read/write head 100 is contained. The head stack assembly is an element to which the HGA 200 is mounted to arms of a carriage having a plurality of arms. FIG. 9 is a side view of this assembly and FIG. 10 is a plan view of the entire magnetic recording apparatus.

A head stack assembly 250 has a carriage 251 having a plurality of arms 260. The HGA 200 is mounted to each arm 260 at intervals to be aligned in the vertical direction. A coil 231 (see FIG. 8), which is to be a portion of a voice coil motor is mounted at the opposite portion of the arm 260 in the carriage 251. The voice coil motor has a permanent magnet 263 arranged at an opposite location across the coil 231.

Referring finally to FIG. 10, the head stack assembly 250 is shown incorporated into a magnetic recording apparatus 290. The magnetic recording apparatus 290 has a plurality of magnetic recording media 14 mounted on a spindle motor 261. Each individual recording media 14 has two TAMR elements 100 arranged opposite to each other across the magnetic recording media 14 (shown clearly in FIG. 9). The head stack assembly 250 and the actuator (except for the read/write head itself) act as a positioning device and support the PMR heads 100. They also position the PMR heads correctly opposite the media surface in response to electronic signals. The read/write head records information onto the surface of the magnetic media by means of the magnetic pole contained therein.

To sum up, by properly adjusting PR for a PMR write head in a TAMR configuration one can ensure that it is the shields, that have a broad protrusion, act as bumper pads during a TD, both to enhance TD detection and to avoid wear at locations on a head where there is a sharp thermal protrusion. To achieve this goal, the PR value can usually be chosen to be equal to or larger than its value at the TP.

As is understood by a person skilled in the art, the present description is illustrative of the present disclosure rather than limiting of the present disclosure. Revisions and modifications may be made to methods, materials, structures and dimensions employed in operating a HDD-mounted slider configured for PMR TAMR recording that uses selected settings of a PR value to ensure that accurate FH measurements of HDIs can be taken during write TDs and that eliminates head damage during head/media interactions while still operating such a device in accord with the spirit and scope of the present disclosure as defined by the appended claims.

What is claimed is:

1. A method for operating a PMR read/write head configured for Perpendicular Magnetic Recording Thermally Assisted Recording (PMR TAMR), comprising:

providing PMR read/write head configured for TAMR and a TAMR apparatus for supplying optical power;

said PMR read/write head including read and write shields formed, respectively adjacent to said read head and said write head; wherein said PMR further includes at least one read heater (Hr) formed adjacent to said read head and at least one write heater (Hw) formed adjacent to said write head, said Hr and Hw being configured for being supplied power independently; wherein said PMR further includes at least one head-disk interference sensor (HDIs); wherein a narrow write gap is formed at an ABS of said write head; then, choosing a value of a power ratio, PR, where PR=([Hr power]/[(Hr power)+(Hw power)])*100%, to ensure that when a read or write touchdown occurs, said read shields and said write shields and said at least one HDIs will approach said disk surface to within a distance that will enable said HDIs to effectively and reliably signal said touchdown (TD) and will protect from wear a sharp protrusion of said write head caused by TAMR heating.

2. The method of claim 1 wherein said PMR read/write head configured for Perpendicular Magnetic Recording Thermally Assisted Recording (PMR TAMR) is mounted on a slider whereby said PMR read/write head is maintained at a flying height by aerodynamic properties of said slider when said slider is positioned above a rotating magnetic recording disk, but wherein said slider mounted PMR read/write head may undergo touchdowns (TD) which are required to be detected.

3. The method of claim 1 wherein during TD detection a large value of PR is used in a preheat mode wherein only said read and write heaters are operating and there is no writer current and a TAMR apparatus, which supplies optical power to said PMR read/write head, is not operative.

4. The method of claim 3 wherein said large value of PR is at least the turning point (TP) value, which is the mid-range value of PR.

5. The method of claim 1 wherein a large value of PR is used during write TD detection, where there is a writer current and said TAMR is operative.

6. The method of claim 4 wherein a value of PR=70% enables said HDIs to accurately detect TD and enables shields to prevent head wear to sharp protrusion caused by TAMR heating.

7. The method of claim 1 wherein said TAMR apparatus includes a source for supplying power in the form of electromagnetic radiation, a waveguide to transfer said electromagnetic radiation towards said ABS and a plasmon generator to produce plasmon modes by coupling to said electromagnetic radiation and to then direct near-field energy from said plasmon modes to a position on a rotating disk that is generally coincident to a region upon which said write head directs a magnetic flux.

8. A method for operating a slider-mounted PMR read/write head configured for Perpendicular Magnetic Recording Thermally Assisted Recording (PMR TAMR) in a hard disk drive (HDD), comprising:

providing a HDD including a rotatable hard disk, a slider-mounted PMR read/write head configured for TAMR and a TAMR apparatus; wherein said PMR read/write head comprises a magnetically shielded read head and a magnetically shielded write head wherein read and write shields are formed, respectively adjacent to said read head and said write head; wherein said slider is an aerodynamically configured prism that maintains said PMR read/write head at a flying height (FH) when positioned above a rotating magnetic medium; wherein said slider-mounted PMR further includes at least one read heater (Hr) formed adjacent to said read head and at least one write heater (Hw) formed adjacent to said write head, said Hr and Hw being configured for being supplied power independently; wherein said PMR further includes at least one head-disk interference sensor (HDIs); wherein a narrow write gap is formed at an ABS of said write head, said write gap comprising a magnetic pole tip and a spot at which an optical near-field is emergent; then, upon setting said hard disk into rotational motion, choosing a value of a power ratio, PR, where PR=([Hr power]/[(Hr power)+(Hw power)])*100%, to ensure that when a read or write touchdown occurs, said read shields and said write shields and said at least one HDIs will approach said disk surface to within a distance that will enable said HDIs to effectively and reliably signal said touchdown and will protect from wear a sharp protrusion of said write head caused by TAMR heating.

9. A read/write head configured for Perpendicular Magnetic Recording Thermally Assisted Recording (PMR TAMR), comprising:

said PMR read/write head comprises a read head portion and a write head portion; wherein said PMR read/write head comprises read and write shields formed, respectively adjacent to said read head and said write head portions; wherein said PMR read/write head further comprises at least one read heater (Hr) formed adjacent to said read head portion and at least one write heater (Hw) formed adjacent to said write head portion, wherein said Hr and Hw are configured for being supplied power independently; wherein said PMR read/write head further comprises at least one head-disk interference sensor (HDIs); wherein said PMR read/write head is further configured for application of a power ratio, PR, where PR=([Hr power]/[(Hr power)+(Hw power)])*100%, whose value is chosen to ensure that when an intentional touchdown (TD) is made to occur, said read shields and said write shields and said at least one HDIs will approach a disk surface to within a distance that will enable said HDIs to clearly and reliably signal said touchdown and will also protect from wear a sharp protrusion of said write head caused by TAMR heating.

10. The read/write head configured for Perpendicular Magnetic Recording Thermally Assisted Recording (PMR TAMR) mounted on a slider, comprising:

the read/write head of claim 9;

a slider aerodynamically configured to support a PMR TAMR read/write head at a stable flying height (FH) above a rotating magnetic recording medium;

said read/write head mounted on said slider.

11. The slider-mounted PMR read/write head of claim 10 installed in a hard disk drive (HDD) configured for thermally assisted magnetic recording (TAMR) and further comprising a TAMR apparatus for supplying optical power to said write head.

12. The PMR read/write head of claim 9 wherein, during TD detection, a value of PR that is at least a turning point (TP) value is chosen and used in a preheat mode wherein only said read and write heaters are operating and there is no writer current and the TAMR is not operative.

13. The PMR read/write head of claim 9 wherein a large value of PR, that is at least the turning point (TP) value, is chosen and used during write TD detection, where there is a writer current and said TAMR is operative.

14. The PMR read/write head of claim 9 wherein a value of PR=70% can be chosen and used and said value enables said HDIs to accurately detect TD and enables shields to prevent head wear to sharp protrusion caused by TAMR heating.

15. The PMR read/write head of claim 9 wherein said TAMR configuration comprises a source for supplying power in the form of electromagnetic radiation, a waveguide to transfer said electromagnetic radiation towards an ABS and a plasmon generator to produce plasmon modes by coupling to said electromagnetic radiation and to then direct near-field energy from said plasmon modes to a position on a disk that is generally coincident to a region upon which said write head directs a magnetic flux.

16. A head gimbal assembly, comprising The slider-mounted PMR read/write head of claim 10;

a suspension that elastically supports said slider-mounted PMR read/write head, wherein said suspension has a flexure to which said slider-mounted PMR read/write head is joined, a load beam with one end connected to said flexure and a base plate connected to the other end of said load beam.

17. A hard disk drive (HDD), comprising:

said head gimbal assembly of claim 16;

a magnetic recording medium positioned opposite to said slider-mounted PMR read/write head;

a spindle motor that rotates and drives said magnetic recording medium;

a device that positions said slider relative to said magnetic recording medium.

* * * * *